UNITED STATES PATENT OFFICE.

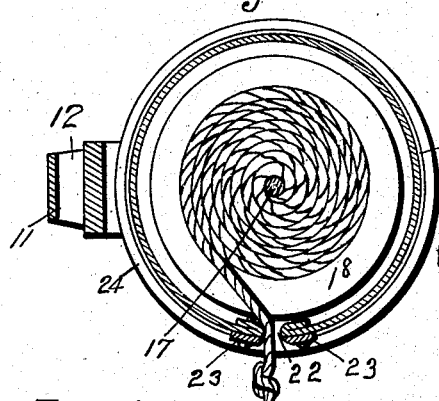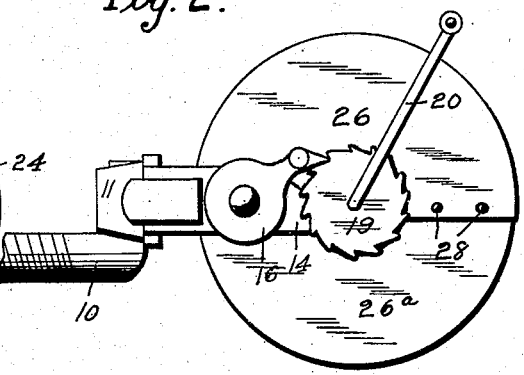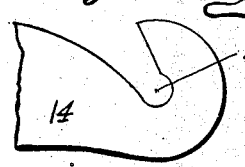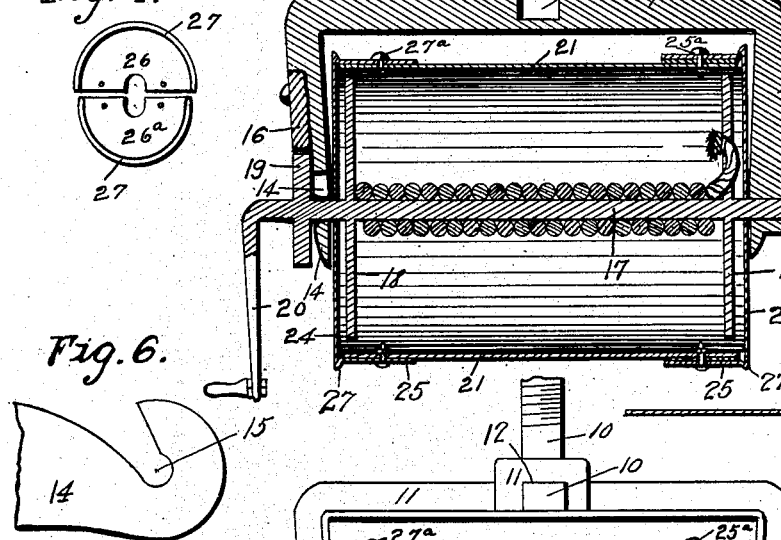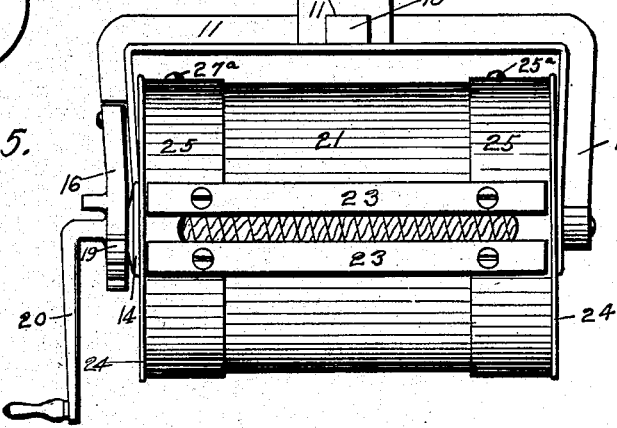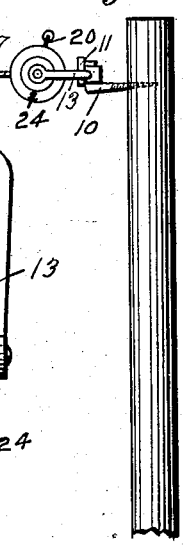

EOLA E. BLACKLEDGE AND JOHN CHAPLIN, OF NEWTON, IOWA.

CLOTHES-LINE REEL.

No. 900,823.　　　Specification of Letters Patent.　　　Patented Oct. 13, 1908.

Application filed January 25, 1907. Serial No. 353,971.

*To all whom it may concern:*

Be it known that we, EOLA E. BLACKLEDGE and JOHN CHAPLIN, citizens of the United States, residing at Newton, in the county of Jasper and State of Iowa, have invented a certain new and useful Clothes-Line Reel, of which the following is a specification.

The objects of our invention are to provide a clothes line reel of simple, durable and inexpensive construction, and further to provide a device of this kind so weighted that the slot or opening through which the rope passes will always stand at the bottom of the reel when the clothes line is reeled up therein to prevent the entrance of water into the interior of the reel casing.

Our invention consists in the construction, arrangement and combination of the various parts of the device, whereby the objects contemplated are attained, as hereinafter more fully set forth, pointed out in our claims and illustrated in the accompanying drawings, in which—

Figure 1 shows a vertical, transverse, sectional view through the center of the reel embodying our invention. Fig. 2 shows an end elevation of same. Fig. 3 shows a central, longitudinal, sectional view of same. Fig. 4 shows an end elevation of one of the casing ends showing the detachable feature. Fig. 5 shows an inverted plan view of the complete reel. Fig. 6 shows an enlarged detail view of the hook or one end of the frame to receive the reel shaft, and Fig. 7 shows a post with our improved reel thereon as in use.

Referring to the accompanying drawings, we have used the reference numeral 10 to indicate the hook for supporting the reel. The reel frame may be cast complete in one piece and comprises a body portion 11 provided with an angular opening 12 to receive the hook 10 and provided with an arm 13 at one side having an opening in its end to receive a shaft and also provided with an arm 14 at its other end having a hook 15 therein to receive the other end of the shaft. Pivoted to the arm 14 adjacent to the hook is a gravity pawl 16. The reel shaft is indicated by the reference numeral 17 and has formed integral near each end a disk 18. One of said disks is provided with two openings to receive the end of a rope to be wound upon the shaft 17, as shown in Fig. 3. On one end outside of the disk and spaced therefrom is a ratchet wheel 19 and on the same end outside of the ratchet wheel is a crank 20. This entire device is preferably cast complete in one piece.

The casing comprises a cylindrical body portion 21 having a slot 22 at one side through which a rope may be passed. Fixed to the casing on opposite sides of said slots are two bars 23 which bars provide sufficient weight to normally hold the slot in the casing downwardly. Said bars also serve to form smooth round edges over which the rope may be passed. One end of the casing comprises a disk 24 with a flange 25 to pass over the end of the cylinder 21 to which it is attached by the bolts $25^a$. This disk is provided with a central opening to receive the end of the shaft 17. The other end of the casing is made of two parts 26 and $26^a$, as clearly shown in Fig. 4, each being provided with a flange member 27. The part 26 is designed to overlap the part $26^a$ and be connected therewith by rivets or screws 28. The flange members 27 are connected to the cylinder 21 by the bolts $27^a$. The parts of the casing are also held together by means of the bars 23.

We assemble the parts of the device, as follows: The casing 21 is first placed over the shaft 17, then the disk 24 is placed on one end of the shaft and with its flange projecting over the end of the cylinder. Then the partition of the other end of the cylinder is separately placed in position between the disk 18 and the ratchet wheel 19. Then the end of the shaft is projected through the opening in the arm 13 and finally the other end portion of the shaft is placed in the hook 15 of the arm 14. This will bring the pawl 16 into engagement with the ratchet wheel 19. A clothes line is fixed to and wound upon the shaft 17 and its end is projected through the slot in the side of the cylinder 21.

In practical use, the hook or bolt 10 is fixed to a stationary support and the frame 11 placed thereon, as described. The operator may then grasp one end of the rope and pull it out as far as desirable and attach it to a suitable support. He may then grasp the crank 20 and wind up the rope until it is stretched taut, whereupon the pawl 16 will hold it in its stretched position. If it is desired to loosen and wind up the rope, the operator first releases the pawl 16 and then permits the shaft to rotate sufficiently to furnish slack in the rope so that it may be disengaged from its support. Then the operator winds up the entire rope upon the shaft and when this is done, he releases the crank. Thereupon the weight of the bars 23 will operate to throw the cylinder 21 to position with the slot underneath so that rain can not enter the cylinder.

Having thus described our invention, what we claim and desire to secure by Letters Patent of the United States, therefor is—

In a clothes line reel, the combination of a frame comprising a body portion provided with an angular opening to receive a hook, and one arm having an opening at one end, and another arm having a hook, a shaft having one end inserted in said opening, and the other end detachably mounted in the hook and having formed near each end a disk, a ratchet wheel formed on the shaft beyond the disk at one end and outside of said hook, a pawl pivoted to the adjacent arm to engage said ratchet wheel, a crank on one end of said shaft, a casing comprising a cylindrical body portion having a slot at one side, a detachable head at each end of the body portion overlapping the body portion, and rotatably mounted upon the shaft adjacent to the outer face of one disk, one of said heads being formed of two semi-circular parts arranged in overlapping positions, and secured together, and two bars secured to said heads and arranged to stand on opposite sides of said slot to thereby form smooth edges for the opening, and also to provide a weight that will normally hold the side of the casing to which they are attached downwardly, said bars also serving to connect the casing heads together.

EOLA E. BLACKLEDGE.
JOHN CHAPLIN.

Witnesses:
E. L. EARLEY,
GLEN C. WHEELER.